United States Patent
Ha et al.

(10) Patent No.: US 11,757,352 B2
(45) Date of Patent: Sep. 12, 2023

(54) POWER CONVERSION SYSTEM FOR ELECTRICALLY DRIVEN MOBILITY DEVICE AND METHOD FOR CONTROLLING SAME

(71) Applicants: HYUNDAI MOTOR COMPANY, Seoul (KR); KIA CORPORATION, Seoul (KR)

(72) Inventors: Tae Jong Ha, Seoul (KR); Dae Woo Lee, Incheon (KR); Byung Gu Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/470,107

(22) Filed: Sep. 9, 2021

(65) Prior Publication Data

US 2022/0368215 A1 Nov. 17, 2022

(30) Foreign Application Priority Data

May 11, 2021 (KR) .......................... 10-2021-0060933

(51) Int. Cl.
*H02M 1/32* (2007.01)
*H02J 1/02* (2006.01)

(52) U.S. Cl.
CPC .................. *H02M 1/32* (2013.01); *H02J 1/02* (2013.01)

(58) Field of Classification Search
CPC .......... H02M 1/32; H02M 1/322; H02M 1/20; H02M 1/10; H02J 3/32; H02J 3/322; H02J 3/28; H02J 3/36
See application file for complete search history.

(56) References Cited

U.S. PATENT DOCUMENTS

| | | | |
|---|---|---|---|
| 2011/0057626 A1* | 3/2011 | Scrimshaw | H02J 7/345 320/166 |
| 2012/0032505 A1* | 2/2012 | Kusumi | B60L 58/18 307/10.1 |
| 2013/0120138 A1* | 5/2013 | Hicks, III | G08B 25/014 340/538 |
| 2014/0268891 A1* | 9/2014 | Sigamani | H02M 1/14 363/17 |
| 2022/0321019 A1* | 10/2022 | Hariya | H02J 7/34 |

FOREIGN PATENT DOCUMENTS

KR 2013-0090678 A 8/2013
KR 2014-0084369 A 7/2014

* cited by examiner

*Primary Examiner* — Nguyen Tran
(74) *Attorney, Agent, or Firm* — MCDONNELL BOEHNEN HULBERT & BERGHOFF LLP

(57) ABSTRACT

A power conversion system for electrically driven mobility device includes a first energy storage device and a second energy storage device having a voltage output lower than a voltage of the first energy storage device, a relay having one terminal connected to the first energy storage device, a DC link capacitor connected to the other terminal of the relay, a first DC converter provided between the DC link capacitor and the second energy storage device and capable of bidirectional voltage conversion, and a controller configured to control the first DC converter to convert a level of the voltage of the second energy storage device and to apply the voltage having the converted level to the capacitor before switching of the relay from an off state to an on state to charge the DC link capacitor to a preset voltage or higher, and then to switch the relay to the on state.

11 Claims, 3 Drawing Sheets

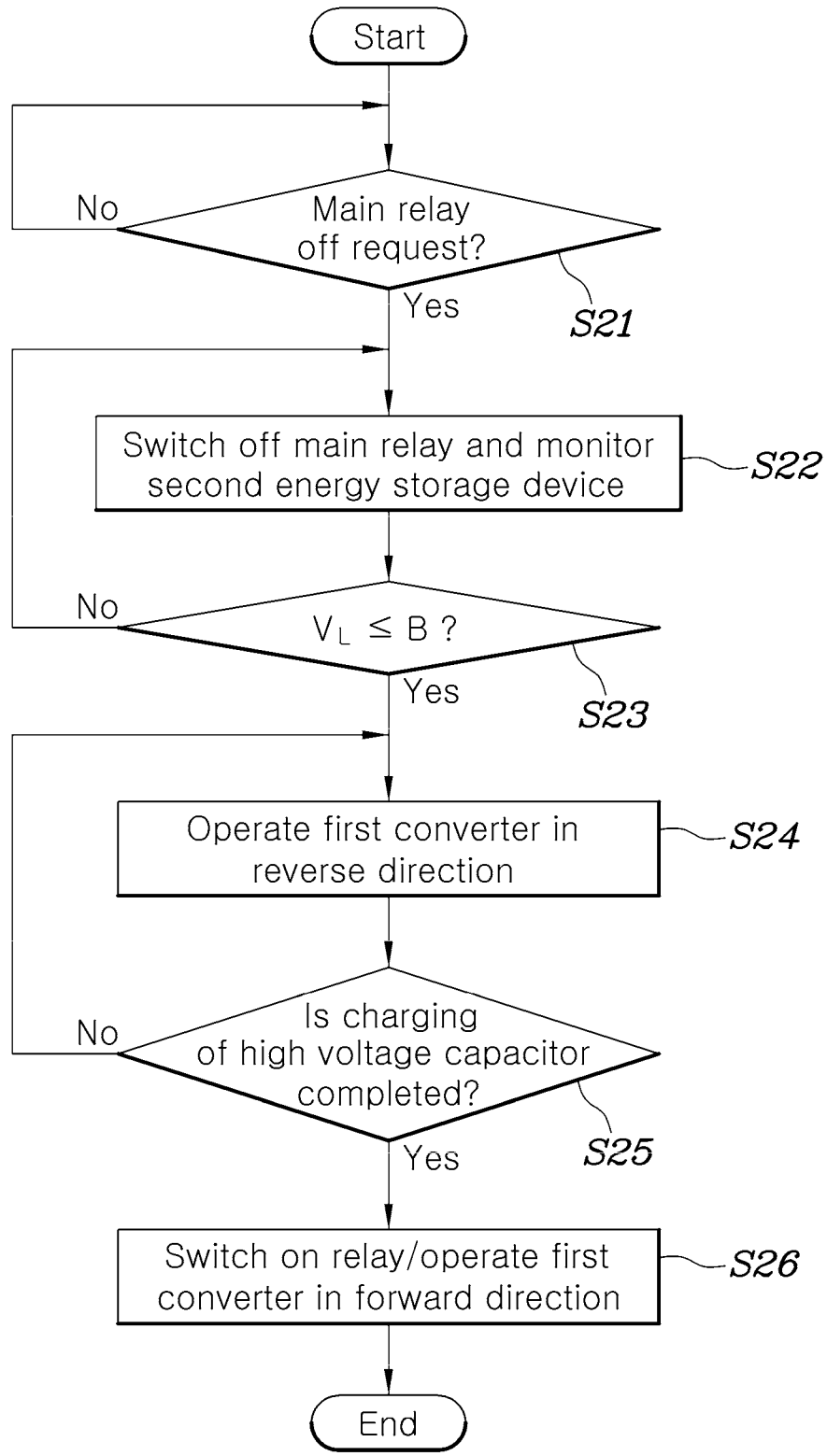

POWER CONVERSION SYSTEM FOR ELECTRICALLY DRIVEN MOBILITY DEVICE AND METHOD FOR CONTROLLING SAME

CROSS REFERENCE TO RELATED APPLICATIONS

This application claims priority to Korean Patent Application No. 10-2021-0060933, filed on May 11, 2021, in the Korean Intellectual Property Office, the disclosure of which is incorporated herein by reference.

BACKGROUND

1. Field

The present disclosure relates to a power conversion system for electrically driven mobility device and a method for controlling the same, and more specifically, to a power conversion system for electrically driven mobility device and a method for controlling the same which can prevent capacitor damage due to sudden input voltage fluctuation by charging a high voltage DC link capacitor in advance without using a resistor and a relay for initial charging and reduce price by removing the resistor for initial charging.

2. Description of the Related Art

Vehicles such as electric vehicles and plug-in hybrid vehicles and mobility devices including electric driving devices, such as urban air mobility (UAM) and robots may include a high voltage battery storing power for driving a high power motor, a low voltage battery storing power to be provided as a power supply voltage of loads operating with a low voltage, and a DC converter for converting a voltage level of the high voltage battery to charge the low voltage battery.

In addition, electrically driven mobility devices may include a DC link capacitor for generating a high DC link voltage and may charge the DC link capacitor to generate the DC link voltage by switching a main relay connected to the high voltage battery from an off state to an on state at the time of starting the mobility device.

If the main relay in an off state is switched on at the time of starting the electrically driven mobility device, abrupt current inflow from the high voltage battery into the DC link capacitor occurs and thus may damage the DC link capacitor.

To prevent damage of the DC link capacitor, a method of additionally providing a resistor and a relay for initial charging connected in series, switching on the relay for initial charging first at the time of starting the system to block abrupt current inflow through the resistor for initial charging, and switching on the main relay and switching off the relay for initial charging when the DC link capacitor is charged to a preset voltage or more has been conventionally employed.

However, the conventional resistor and relay for initial charging do not meet technical requirements of recent electrically driven mobility device that requires reduction in the weight and size and cause a problem of increasing costs required for system configuration.

It will be understood that the above matters described in the related art are merely for promotion of understanding of the background of the disclosure and should not be recognized as prior art well-known to those skilled in the art.

SUMMARY

Therefore, the present disclosure has been made in view of the above problems, and it is an object of the present disclosure to provide a power conversion system for electrically driven mobility device and a method for controlling the same which can initially charge a DC link capacitor to prevent damage of the DC link capacitor due to abrupt current inflow at the time of starting the mobility device without a resistor and a relay for initial charging.

In accordance with the present disclosure, the above and other objects can be accomplished by the provision of a power conversion system for an electrically driven mobility device, including a first energy storage device and a second energy storage device having a voltage output lower than a voltage of the first energy storage device, a relay having one terminal connected to the first energy storage device, a DC link capacitor connected to the other terminal of the relay, a first DC converter provided between the DC link capacitor and the second energy storage device and capable of bidirectional voltage conversion, and a controller configured to control the first DC converter to convert a level of the voltage of the second energy storage device and to apply the voltage having the converted level to the capacitor before switching of the relay from an off state to an on state to charge the DC link capacitor to a preset voltage or higher, and then to switch the relay to the on state.

In an embodiment of the present disclosure, the first DC converter may drop a DC voltage generated in the DC link capacitor to output a voltage at a level appropriate for charging of the second energy storage device or may boost a DC voltage output from the second energy storage device to output a preset voltage at a level necessary to initially charge the DC link capacitor.

In an embodiment of the present disclosure, the first DC converter may include a bridge circuit including a plurality of switching elements and configured to convert the DC voltage generated in the DC link capacitor into an AC voltage, a transformer configured to convert a width of the AC voltage converted by the bridge circuit at a preset turn ratio, and a synchronous rectification circuit including a plurality of switching elements and configured to convert the AC voltage having the width converted by the transformer into a DC voltage and to provide the DC voltage to the second energy storage device.

In an embodiment of the present disclosure, the second energy storage device may be a super-capacitor array.

In an embodiment of the present disclosure, the power conversion system may further include a second DC converter connected between the DC link capacitor and the second energy storage device in parallel to the first DC converter.

In an embodiment of the present disclosure, the second DC converter may be an active clamp forward converter.

In an embodiment of the present disclosure, the controller may operate the first DC converter in a reverse direction to charge the DC link capacitor to a preset initial charge voltage upon reception of input of a request for switching on the relay, and when the DC link capacitor has been charged to the initial charge voltage, switch on the relay, operate one of the first DC converter and the second DC converter to drop the voltage of the DC link capacitor, and apply the dropped voltage to the second energy storage device.

In an embodiment of the present disclosure, when a load amount required by an electric load provided with power from the second energy storage device increases to be greater than a preset reference value after one of the first DC converter and the second DC converter is operated, the controller may operate the other DC converter that is not operated.

In an embodiment of the present disclosure, the controller may monitor the second energy storage device in an off state of the relay, operate the first DC converter in the reverse direction to charge the DC link capacitor to the preset initial charge voltage when an amount of power stored in the second energy storage device decreases to below a preset reference value, and when the DC link capacitor has been charged to the initial charge voltage, switch on the relay, operate the first DC converter to drop the voltage of the DC link capacitor, and apply the dropped voltage to the second energy storage device.

In accordance with another aspect of the present disclosure, there is provided a method for controlling a power conversion system for an electrically driven mobility device including a first energy storage device, a second energy storage device having a voltage output lower than a voltage of the first energy storage device, a relay having one terminal connected to the first energy storage device, a DC link capacitor connected to the other terminal of the relay, a first DC converter provided between the DC link capacitor and the second energy storage device and capable of bidirectional voltage conversion, and a second DC converter connected between the first DC converter and the DC link capacitor in parallel to the first DC converter, the method including operating the first DC converter in a reverse direction to charge the DC link capacitor to a preset initial charge voltage when a request for switching on the relay is input, switching on the relay when the DC link capacitor has been charged to the initial charge voltage, and operating one of the first DC converter and the second DC converter to drop the voltage of the DC link capacitor and applying the dropped voltage to the second energy storage device.

In an embodiment of the present disclosure, the method may further include operating the other DC converter that is not operated when a load amount required by an electric load provided with power from the second energy storage device increases to be greater than a preset reference value after the applying of the dropped voltage to the second energy storage device.

In accordance with a further aspect of the present disclosure, there is provided a method for controlling a power conversion system for an electrically driven mobility device including a first energy storage device, a second energy storage device having a voltage output lower than a voltage of the first energy storage device, a relay having one terminal connected to the first energy storage device, a DC link capacitor connected to the other terminal of the relay, a first DC converter provided between the DC link capacitor and the second energy storage device and capable of bidirectional voltage conversion, and a second DC converter connected between the first DC converter and the DC link capacitor in parallel to the first DC converter, the method including operating the first DC converter in a reverse direction to charge the first DC converter in a reverse direction to charge the DC link capacitor to a preset initial charge voltage when an amount of power stored in the second energy storage device decreases to below a preset reference value, switching on the relay when the DC link capacitor has been charged to the initial charge voltage, and operating one of the first DC converter and the second DC converter to drop the voltage of the DC link capacitor and applying the dropped voltage to the second energy storage device.

BRIEF DESCRIPTION OF THE FIGURES

The above and other objects, features and other advantages of the present disclosure will be more clearly understood from the following detailed description taken in conjunction with the accompanying drawings, in which:

FIG. 3 is a flowchart illustrating another example of operation of the power conversion system for the electrically driven mobility device according to an embodiment of the present disclosure.

DETAILED DESCRIPTION

Hereinafter, a power conversion system for electrically driven mobility device according to various embodiments of the present disclosure will be described in detail with reference to the attached drawings.

Figure 1:
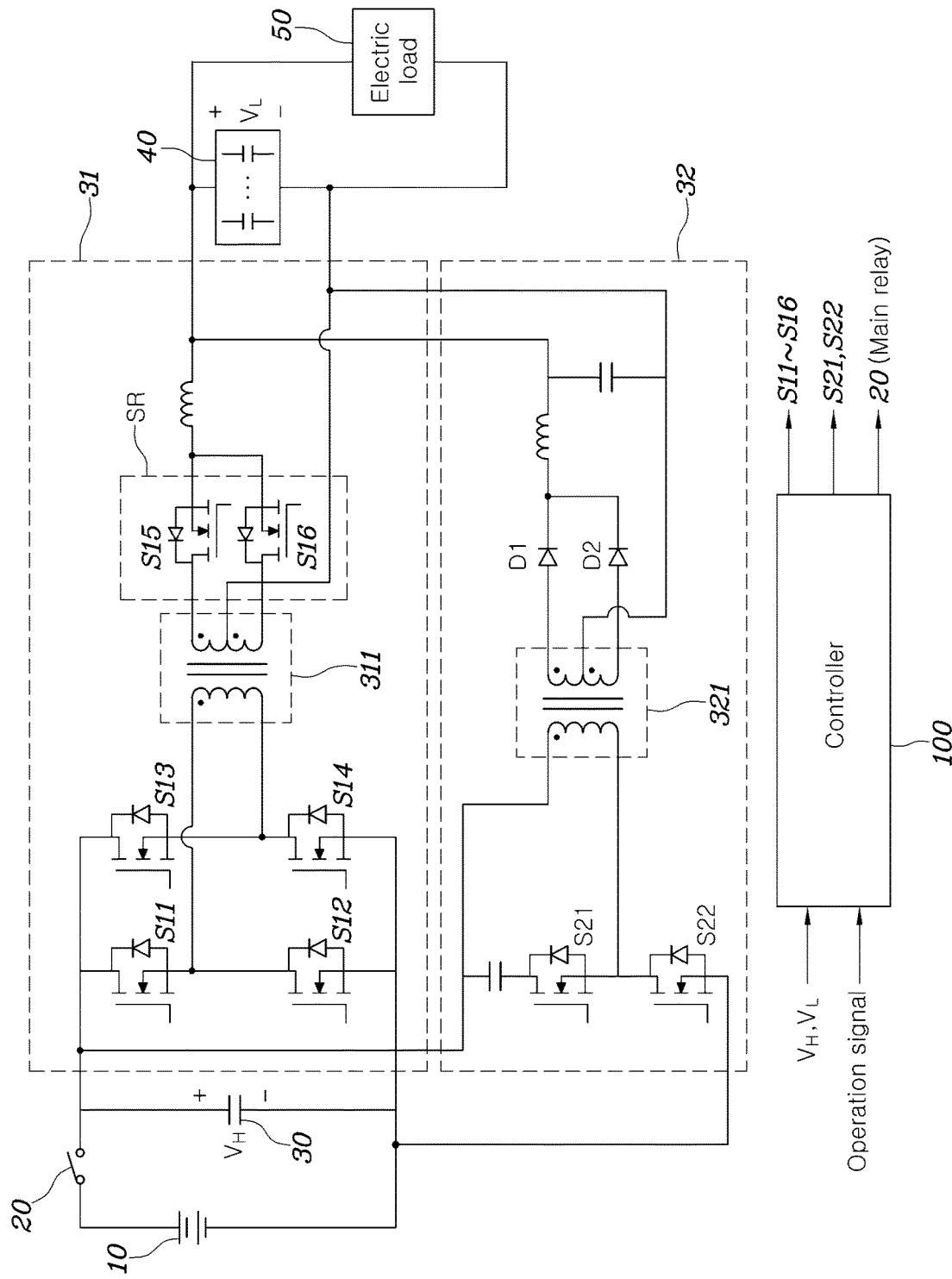
FIG. 1 is a circuit diagram of a power conversion system for an electrically driven mobility device according to an embodiment of the present disclosure.

FIG. 1 is a circuit diagram of a power conversion system for an electrically driven mobility device according to an embodiment of the present disclosure.

Referring to FIG. 1, the power conversion system for the electrically driven mobility device according to an embodiment of the present disclosure may include a first energy storage device 10 for storing high voltage power, a second energy storage device 40 for storing relatively low voltage power, a relay 20 connected to the first energy storage device 10 through one terminal thereof, a DC link capacitor 30 connected to the other terminal of the relay 20, a first DC converter 31 provided between the DC link capacitor 30 and the second energy storage device 40 and capable of bidirectional voltage conversion, and a controller 100.

The first energy storage device 10 is an element storing high voltage (e.g., about 400 V or more) energy used as power for a motor that generates driving power of the mobility device and may be commonly referred to as a high voltage battery or a main battery. Power discharged from the first energy storage device 10 may be provided to a motor (not illustrated) and used to generate motor torque. In addition, the second energy storage device 40 may be charged with AC or DC power provided by charging equipment provided outside the mobility device. When externally-provided charging power is AC power, the mobility device may include a charger (not illustrated) for converting the AC power into DC power having a chargeable voltage level.

The second energy storage device 40 may provide a voltage (e.g., about 12 V) lower than the voltage of the first energy storage device 10 in order to provide a power supply voltage to an electric load 50 in the mobility device.

The second energy storage device 40 may be implemented in various manners and, particularly, implemented as a super-capacitor array in which a plurality of super-capacitors is connected in parallel in an embodiment of the present disclosure. When the second energy storage device 40 is implemented as the super-capacitor array, the size and weight thereof can be considerably reduced as compared to a general lead-acid battery or lithium battery.

Particularly, when the second energy storage device 40 is implemented as the super-capacitor array, the second energy storage device 40 may be configured in a module of a converter in terms of hardware, and thus the voltage or current of the second energy storage device 40 can be measured by sharing a sensing circuit of a converter output terminal without an additional sensing circuit.

The relay 20 may switch from an off state to an on state when the mobility device starts. The relay 20 may be controlled by the controller 100 which will be described later.

In a conventional system, a resistor and a relay for initial charging are connected in parallel to the relay 20. Such a conventional system employs a method of switching on the relay for initial charging in advance by the controller 100 such that current flows through the resistor for initial charging at the time of initial start-up of the mobility device to initially charge the DC link capacitor 30 while preventing abrupt current inflow into the mobility device.

However, in the power conversion system for electrically driven mobility device according to an embodiment of the present disclosure, the resistor and the relay for initial charging are eliminated, and the controller 100 causes the DC link capacitor 30 to be charged to a voltage $V_H$ at a preset level or higher using the power stored in the second energy storage device 40 before switching the relay 20 from an off state to an on state and then switches on the relay 20 at the time of starting the mobility device. Accordingly, the power conversion system for electrically driven mobility device according to an embodiment of the present disclosure can initially charge the DC link capacitor 30 without using the resistor and the relay for initial charging.

To charge the DC link capacitor 30 using the power stored in the second energy storage device 40, the first DC converter 31 provided between the DC link capacitor 30 and the second energy storage device 40 may be implemented as a converter capable of bidirectional operation.

The first DC converter 31 may drop the DC voltage generated in the DC link capacitor 30 to output a voltage at a level appropriate for charging of the second energy storage device 40 or boost the DC voltage output from the second energy storage device 40 to output a preset voltage at a level necessary to initially charge the DC link capacitor 30.

As illustrated in FIG. 1, the first DC converter 31 may be implemented in a topology of an insulation type DC-DC converter circuit including a transformer 311 for electrical insulation.

More specifically, the first DC converter 31 may include a bridge circuit that includes a plurality of switching elements S11 to S14 and converts the DC voltage generated in the DC link capacitor 31 into an AC voltage, the transformer 311 that converts the width of the AC voltage converted by the bridge circuit according to a preset turn ratio, and a synchronous rectification circuit SR that includes a plurality of switching elements S15 and S16, converts the AC voltage having the width converted by the transformer 311 into a DC voltage and provides the DC voltage to the second energy storage device 40.

As described above, the first DC converter 11 may convert a voltage in a direction (hereinafter referred to as a reverse direction) reverse to a power flow direction (hereinafter referred to as a forward direction) when the second energy storage device 40 is charged. In this case, the DC voltage of the second energy storage device 40 may be converted into an AC voltage according to switching of the switching elements S15 and S16 constituting the synchronous rectification circuit SR and input to the transformer 311, the transformer 311 may convert the width of the AC voltage input from the synchronous rectification circuit SR according to the turn ratio and output the AC voltage having the converted width to the bridge circuit composed of the switching elements S11 to S14, and the bridge circuit may convert the AC voltage input from the transformer 311 and apply the converted voltage to the DC link capacitor 30.

The level of the voltage converted by the first DC converter 31 may be appropriately controlled by the turn ratio of the transformer 311 and switching duty ratios of the switching elements S11 to S14, S15, and S16 included in the bridge circuit and the synchronous rectification circuit SR.

The controller 100 may determine the switching duty ratios of the switching elements S11 to S14, S15, and S16 included in the bridge circuit and the synchronous rectification circuit SR according to a relation between levels of input/output voltages and control on/off of the switching duty ratios of the switching elements S11 to S14, S15, and S16 included in the bridge circuit and the synchronous rectification circuit SR according to the determined duty ratios.

An embodiment of the present disclosure may further include an additional second DC converter 32 that includes a transformer 321 and performs unidirectional power transfer. Particularly, when the second energy storage device 40 is implemented as a super-capacitor array, it is advantageous to include the second DC converter 32 to cope with large electric transient loads (e.g., steering, braking and transient motor loads, etc.).

The second DC converter 32 may be connected between the DC link capacitor 30 and the second energy storage device 40 in parallel to the first DC converter 31.

The second DC converter 32 may operate along with the first DC converter 31 when power that needs to be provided from the first energy storage device 10 to the second energy storage device 40 is high.

As illustrated in FIG. 1, the second DC converter 32 serves to assist the first DC converter 32 and may be implemented as an active clamp forward converter capable of unidirectional power transfer and having a small size and high efficiency.

The controller 100 may perform control for initially charging the DC link capacitor 30 at the time of initial start-up of the system, as described above, and perform control for simultaneous operation of the first DC converter 31 and the second DC converter 32 when a specific condition is satisfied.

Figure 2:
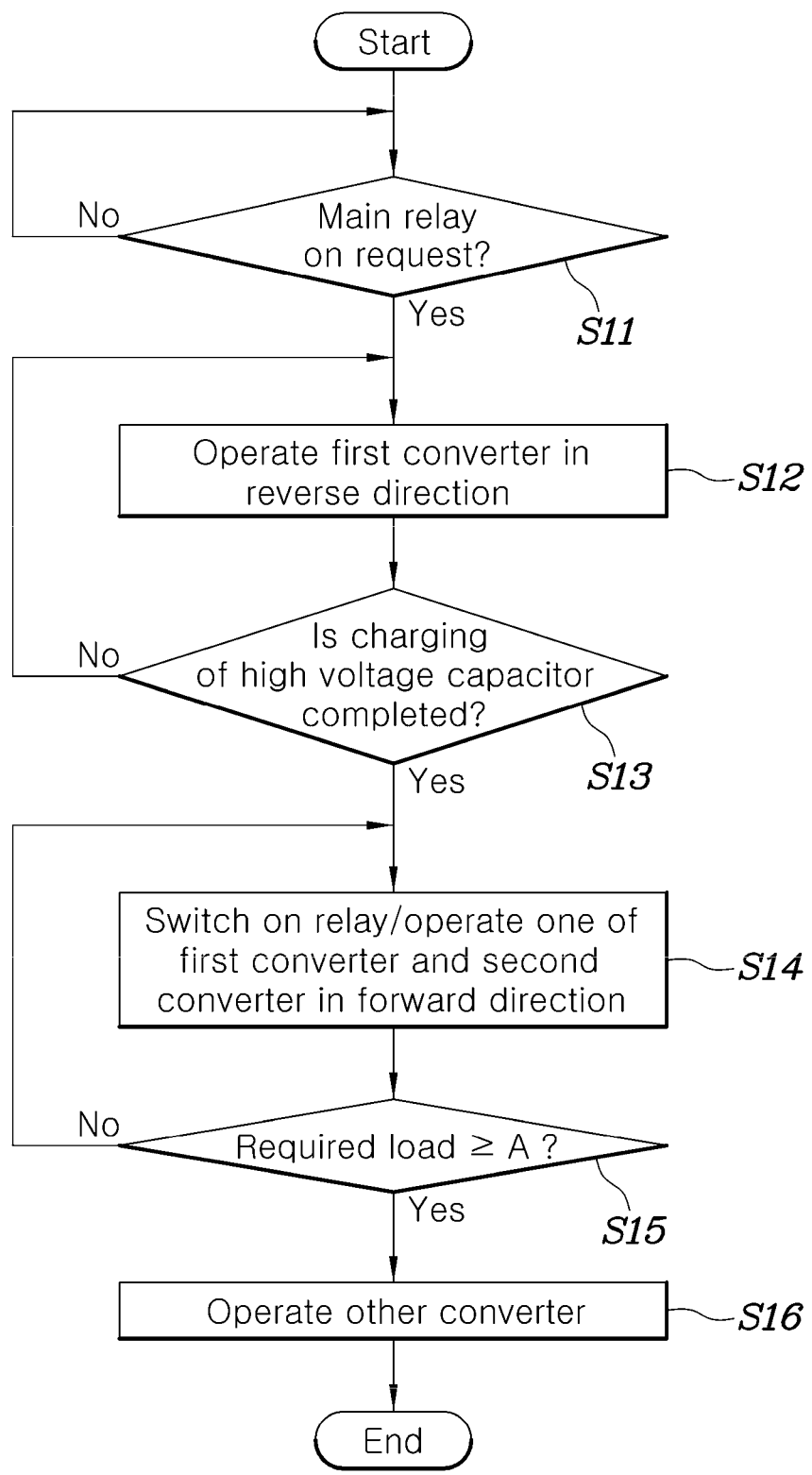
FIG. 2 is a flowchart illustrating an example of operation of the power conversion system for the electrically driven mobility device according to an embodiment of the present disclosure.

FIG. 2 and FIG. 3 are flowcharts illustrating various operation examples of the power conversion system for electrically driven mobility device according to an embodiment of the present disclosure. Operations of the flowcharts illustrated in FIG. 2 and FIG. 3 are performed by control of the controller 100, and operation of the present disclosure and effects according thereto will be understood more clearly through description of FIG. 2 and FIG. 3.

Referring to FIG. 2, the controller 100 may operate the first DC converter 31 in the reverse direction at S12 upon reception of input of a request for switching on the main relay 20 for driving the system, such as user input at S11. That is, the controller 100 may operate the first DC converter 31 such that the first DC converter 31 boosts the level of the voltage of the second energy storage device 40 to a preset level of an initial charge voltage of the DC link capacitor 30. Accordingly, the DC link capacitor 30 can be charged to the preset initial charge voltage.

Upon completion of charging of the DC link capacitor 30 to the preset initial charge voltage at S13, the controller 100 may switch on the relay 20 to electrically connect the first energy storage device 10 and the DC link capacitor 30, operate one of the first DC converter 31 and the second DC converter 32 to drop the voltage of the DC link capacitor 30 electrically connected to the first energy storage device 10, and apply the dropped voltage to the second energy storage device 40 such that the second energy storage device 40 is charged with the voltage at S14.

Although it is desirable to operate the first DC converter 31 in step S14 when the second DC converter 32 is provided to assist the first DC converter 31, as described above, this is optional and the second DC converter 32 may be operated first in step S14 if the second DC converter 32 has higher performance and efficiency.

If a load amount required by the electric load 50 is greater than a preset reference value A during operation of one of the first DC converter 31 and the second DC converter 32 at S15, the other DC converter may be operated at S16.

Referring to FIG. 3, upon reception of input of a request for switching off the relay 20 in order to power off the mobility device at S21, the controller 100 may switch off the relay 20 and monitor the state of the second energy storage device 40 at S22.

Since the power of the second energy storage device 20 may be consumed for dark current of the electric load 50 even in a power off state of the mobility system, an appropriate measure is necessary before the second energy storage device 40 is fully discharged. To this end, it is desirable that the controller 100 monitor the state of the second energy storage device 40 in step S22.

Since a state of charge of an energy storage device such as a battery or a super-capacitor can be checked using an output voltage of the energy storage device, the controller 100 may monitor the voltage $V_L$ of the second energy storage device 40 in step S22. Of course, the controller 100 may perform other monitoring operations capable of checking the amount of power stored in the energy storage device.

Subsequently, when the amount of power stored in the second energy storage device 40 decreases to below a preset reference value (e.g., when the output voltage of the second energy storage device 40 decreases to below a preset reference value B) at S23, the controller 100 may operate the first DC converter 31 in the reverse direction to charge the DC link capacitor 30 at S24.

That is, the voltage of the second energy storage device 40 is boosted and applied to the DC link capacitor 30 to charge the DC link capacitor according to reverse-direction operation of the first DC converter 31 in step S24, and when the DC link capacitor 30 has been charged to the preset initial charge voltage at S25, the controller 100 may switch on the relay 20 to electrically connect the first energy storage device 10 and the DC link capacitor 30 and operate the first DC converter 31 in the forward direction such that the second energy storage device 40 is charged to prevent the second energy storage device 40 from being fully discharged at S26.

Of course, the controller 100 may cause the second DC converter 32 instead of the first DC converter 31 to operate in step S26 if the second DC converter 32 has higher performance and efficiency.

As described above, according to various embodiments of the present disclosure, it is possible to initially charge the DC link capacitor without a resistor or an additional relay for initially charging the DC link capacitor at the time of initial start-up by providing a DC converter capable of bidirectional operation in a mobility system, converting power stored in a low-voltage energy storage device using the bidirectional DC converter and providing the converted power to a high voltage side.

In this manner, a resistor and a relay used for initial charging can be eliminated according to various embodiments of the present disclosure, and thus a system size and weight, and the price of the mobility device can be reduced.

Furthermore, according to an embodiment of the present disclosure, a system size and weight can be reduced by implementing an energy storage device for storing low voltage power as a super-capacitor array.

In addition, according to an embodiment of the present disclosure, it is possible to improve efficiency in a wide load range through selective operation of DC converters depending on a required load amount by implementing an energy storage device for storing low voltage power as a super-capacitor array and additionally providing a unidirectional DC converter.

According to the power conversion system for electrically driven mobility device, a resistor and a relay used for initial charging can be eliminated, and thus a system size and weight and the price of the mobility device can be reduced.

Furthermore, according to the power conversion system for electrically driven mobility device, a system size and weight can be reduced by implementing an energy storage device for storing low voltage power as a super-capacitor array.

In addition, according to the power conversion system for electrically driven mobility device, it is possible to improve efficiency in a wide load range through selective operation of DC converters depending on a required load amount by implementing an energy storage device for storing low voltage power as a super-capacitor array and additionally providing a unidirectional DC converter.

It will be appreciated by persons skilled in the art that the effects that can be achieved with the present disclosure are not limited to what has been particularly described hereinabove and other advantages of the present disclosure will be more clearly understood from the following detailed description.

Although the specific embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A power conversion system for electrically driven mobility device, comprising:
   a first energy storage device and a second energy storage device having a voltage output lower than a voltage of the first energy storage device;
   a relay having one terminal connected to the first energy storage device;
   a DC link capacitor connected to an other terminal of the relay;
   a first DC converter positioned between the DC link capacitor and the second energy storage device, and capable of bidirectional voltage conversion;
   a controller configured to control the first DC converter to convert a level of the voltage of the second energy storage device, and configured to apply the voltage having the converted level to the DC link capacitor before switching of the relay from an off state to an on state to charge the DC link capacitor to a preset voltage or higher, and then configured to switch the relay to the on state; and
a second DC converter connected between the DC link capacitor and the second energy storage device in parallel to the first DC converter;
wherein the second DC converter includes a first transformer and a plurality of diodes connected to a secondary coil of the first transformer;
wherein the controller is configured to operate the first DC converter in a reverse direction to charge the DC link capacitor to a preset initial charge voltage upon reception of input of a request for switching the relay; and
wherein when the DC link capacitor has been charged to the initial charge voltage, the controller switches on the relay, operates the second DC converter to drop the voltage of the DC link capacitor, and applies the dropped voltage to the second energy storage device.

2. The power conversion system according to claim 1, wherein the first DC converter drops a DC voltage generated in the DC link capacitor to output a voltage at a level appropriate for charging of the second energy storage device or boosts a DC voltage output from the second energy storage device to output a preset voltage at a level necessary to initially charge the DC link capacitor.

3. The power conversion system according to claim 1, wherein the first DC converter includes a bridge circuit including a plurality of switching elements and configured to convert the DC voltage generated in the DC link capacitor into an AC voltage, a second transformer configured to convert a width of the AC voltage converted by the bridge circuit at a preset turn ratio, and a synchronous rectification circuit including a plurality of switching elements and configured to convert the AC voltage having the width converted by the second transformer into a DC voltage and to provide the DC voltage to the second energy storage device.

4. The power conversion system according to claim 1, wherein the second energy storage device is a super-capacitor array.

5. The power conversion system according to claim 1, wherein the second DC converter is an active clamp forward converter.

6. The power conversion system according to claim 1, wherein when the DC link capacitor has been charged to the initial charge voltage, the controller switches on the relay, operates one of the first DC converter and the second DC converter to drop the voltage of the DC link capacitor, and applies the dropped voltage to the second energy storage device.

7. The power conversion system according to claim 6, wherein, when a load amount required by an electric load provided with power from the second energy storage device increases to be greater than a preset reference value after one of the first DC converter and the second DC converter is operated, the controller operates the other DC converter that is not operated.

8. The power conversion system according to claim 1, wherein the controller monitors the second energy storage device in an off state of the relay, operates the first DC converter in the reverse direction to charge the DC link capacitor to the preset initial charge voltage when an amount of power stored in the second energy storage device decreases to below a preset reference value, and when the DC link capacitor has been charged to the initial charge voltage, switches on the relay, operates the first DC converter to drop the voltage of the DC link capacitor, and applies the dropped voltage to the second energy storage device.

9. A method for controlling a power conversion system including a first energy storage device, a second energy storage device having a voltage output lower than a voltage of the first energy storage device, a relay having one terminal connected to the first energy storage device, a DC link capacitor connected to the other terminal of the relay, a first DC converter provided between the DC link capacitor and the second energy storage device and capable of bidirectional voltage conversion, and a second DC converter connected between the first DC converter and the DC link capacitor in parallel to the first DC converter, the method comprising:
operating the first DC converter in a reverse direction to charge the DC link capacitor to a preset initial charge voltage when a request for switching on the relay is input;
switching on the relay when the DC link capacitor has been charged to the initial charge voltage; and
operating the second DC converter to drop the voltage of the DC link capacitor and applying the dropped voltage to the second energy storage device;
wherein the second DC converter includes a transformer and a plurality of diodes connected to a secondary coil of the first transformer.

10. The method according to claim 9, further comprising operating the DC converter that is not operated when a load amount required by an electric load provided with power from the second energy storage device increases to be greater than a preset reference value after the applying of the dropped voltage to the second energy storage device.

11. A method for controlling a power conversion system including a first energy storage device, a second energy storage device having a voltage output lower than a voltage of the first energy storage device, a relay having one terminal connected to the first energy storage device, a DC link capacitor connected to the other terminal of the relay, a first DC converter provided between the DC link capacitor and the second energy storage device and capable of bidirectional voltage conversion, and a second DC converter connected between the first DC converter and the DC link capacitor in parallel to the first DC converter, the method comprising:
operating the first DC converter in a reverse direction to charge the first DC converter in a reverse direction to charge the DC link capacitor to a preset initial charge voltage when an amount of power stored in the second energy storage device decreases to below a preset reference value;
switching on the relay when the DC link capacitor has been charged to the initial charge voltage; and
operating the second DC converter to drop the voltage of the DC link capacitor and applying the dropped voltage to the second energy storage device;
wherein the second DC converter includes a transformer and a plurality of diodes connected to a secondary coil of the first transformer.

\* \* \* \* \*